United States Patent [19]

Sakamoto et al.

[11] Patent Number: 5,081,589
[45] Date of Patent: Jan. 14, 1992

[54] METHOD OF MANUFACTURING GUIDE JIG FOR BENT PIPING MEMBER

[75] Inventors: Yasushi Sakamoto, Shizuoka; Mitsuru Endo, Numazu, both of Japan

[73] Assignee: Usui Kokusai Sangyo Kaisha Limited, Japan

[21] Appl. No.: 453,613

[22] Filed: Dec. 20, 1989

[30] Foreign Application Priority Data

Dec. 30, 1988 [JP] Japan .............................. 63-332182

[51] Int. Cl.$^5$ .............................................. G06F 15/00
[52] U.S. Cl. .............................. 364/474.24; 364/191; 364/512
[58] Field of Search ............... 364/188, 189, 191, 192, 364/474.22, 474.23, 474.24, 521, 522, 512

[56] References Cited

U.S. PATENT DOCUMENTS

| | | | |
|---|---|---|---|
| 4,675,825 | 6/1987 | De Menthon | 364/474.22 |
| 4,697,240 | 9/1987 | Cedar et al. | 364/474.24 |
| 4,845,651 | 7/1989 | Aizawa et al. | 364/522 |
| 4,937,768 | 6/1990 | Carver et al. | 364/474.24 |
| 4,945,488 | 7/1990 | Carver et al. | 364/474.24 |

Primary Examiner—Jerry Smith
Assistant Examiner—Thomas E. Brown
Attorney, Agent, or Firm—Anthony J. Casella; Gerald E. Hespos

[57] ABSTRACT

A guide jig used in confirming the shape of a piping member bent or in brazing end parts and the like thereto is manufactured by generating the shape data of the piping member using a computer, generating the images of connecting parts and the like in relation to the image of the piping member, generating the NC data for machining of the equerres and base plate of the guide jig, machining the actual equerres and base plate using a machining center, assembling the guide jig, and attaching hand vices, positioning pins, etc. to the guide jig.

5 Claims, 3 Drawing Sheets

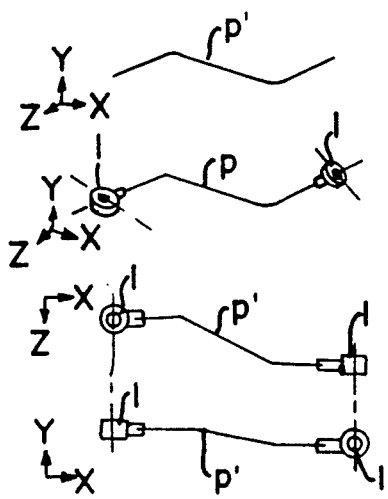
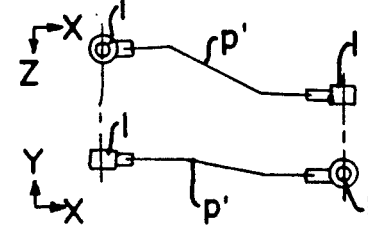
FIG. 1a
FIG. 1b
FIG. 1c₁
FIG. 1c₂
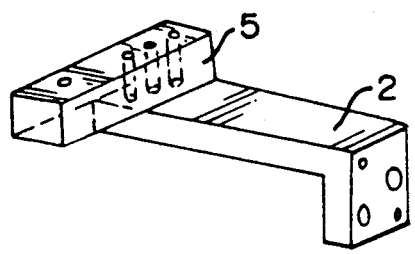
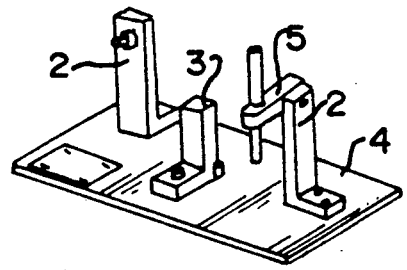
FIG. 1f
FIG. 1g
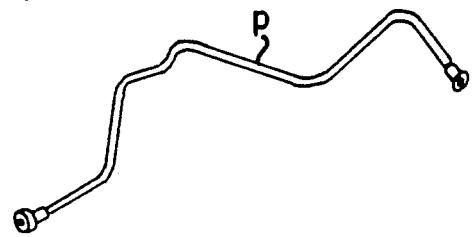
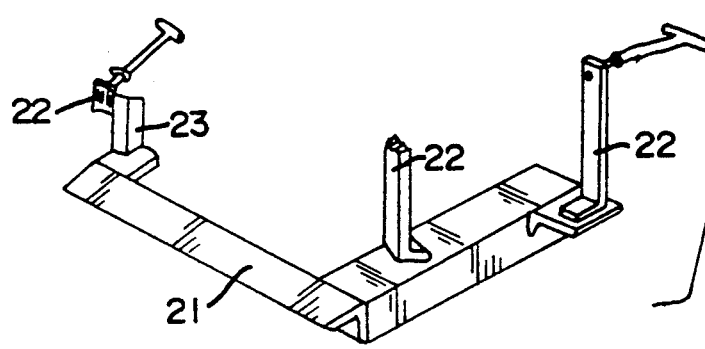
FIG. 2
PRIOR ART

METHOD OF MANUFACTURING GUIDE JIG FOR BENT PIPING MEMBER

BACKGROUND OF THE INVENTION

1. Field of the Invention

This invention relates to the manufacture of a metallic piping member which is bent two- or three-dimensionally, attached at the ends thereof with connecting end parts such as eyejoints, and used as a flow path for air, oil, etc. in various machines such as vehicles, and more particularly to, a manufacturing method of a guide jig which is used in confirming the shape of the bent piping member or in brazing end parts, clamps, etc. to the bent piping member.

2. Description of the Prior Art

According to a conventional method of manufacturing a guide jig for shape confirmation or brazing, as shown in FIG. 2, pipe end or midpoint receiving elements 22 are secured directly or via posts 23 to a jig base 21 conforming in length and shape to a bent piping member P, giving a desired curved shape. In practice, to determine the positions of these components, marking-off lines are drawn on the jig base 21, receiving elements 22, and posts 23 on the basis of data obtained from a design drawing, and then, these components are welded or bolted in accord with these marking-off lines.

Generally, the piping member P has a three-dimensional curved shape, and a setting angle is assigned for each of clamps, connecting end parts, etc. in relation to each mating part. Therefore, according to the prior art, a long time is required for the work of layout designing, marking-off, tacking, etc., this increasing the cost, and a desired degree of accuracy is difficult to obtain due to the heat of welding and the like.

SUMMARY OF THE INVENTION

It is an object of the present invention to provide a manufacturing method of a guide jig which permits accurate and reliable securing of receiving elements to a jig base without marking-off, thus decreasing the manufacturing time and cost of the guide jig.

To accomplish the foregoing object, the present invention provides a manufacturing method of a guide jig which comprises the steps of: generating member shape data by entering the X-, Y- and Z-coordinates of important points, bend radiuses, and end shapes of a piping member of two- or three-dimensional shape on the basis of the design drawing thereof into a computer; generating the images of connecting parts, such as eyejoints and clamps, using a program in relation to the image of the piping member generated by applying the member shape data to a CAD system; determining the reference plane of the guide jig by rotating the image of the piping member and connecting parts; generating NC data for machining of equerres and base plate on the basis of the CAD layout of the guide jig with the equerres or angle brackets and base plate arranged therein; machining the base plate and equerres using a machining center with a diskette unit or the like (to shape, bore, etc.); attaching standard parts to the equerres; securing the equerres to the base plate; and attaching part holding hand vices, positioning pins, etc. to the equerres.

As will be appreciated, according to the present invention, on the basis of five-axis NC data showing the position and orientation of each connecting part and each intermediate important point of a piping member relative to a reference position and reference plane that is obtained from the design drawing of the piping member using a CAD system, a base plate and equerres are machined using a machining center with a diskette unit (to shape, bore, etc.). Standard parts are attached to the equerres; the equerres, preferably after being positioned using knock pins, are bolted and secured to the base plate; part holding hand vices (for eyejoints, clamps, etc.), end positioning pins, etc. are attached to the equerres; and then, the thus assembled guide jig is adjusted. Therefore, there is no need to perform the works of drawing marking-off lines on the jig base, posts, etc., tacking, welding, etc., in contrast to the prior art.

BRIEF DESCRIPTION OF THE DRAWINGS

FIGS. 1a through 1g are diagrams explanatory of the process of manufacturing a guide jig according to the present invention; and FIG. 2 is a perspective view showing a conventional method of manufacturing a guide jig.

DETAILED DESCRIPTION OF THE INVENTION

An embodiment of the present invention will now be described with reference to the drawings.

Figure 1D:
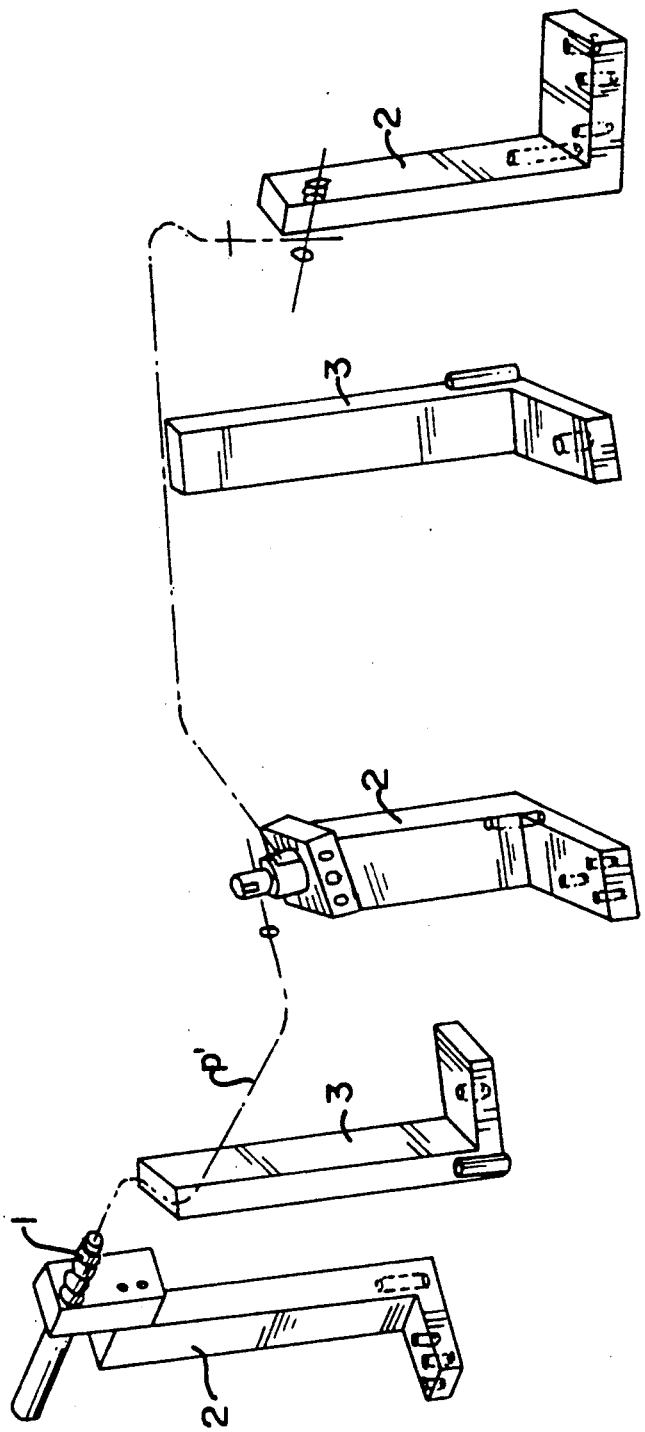

FIGS. 1a through 1g show the process of manufacturing a guide jig according to the present invention. On the basis of a design drawing showing a piping member P of two- or three-dimensional shape that is given from a maker or the like, pipe shape data is entered into a computer as CAD (computer-aided design) data that includes the X-, Y- and Z-coordinates of important points of the piping member P (such as pipe ends, clamp attaching points, and points of intersection between the axial lines of two straight portions around each curved portion), bend radiuses, end shapes, etc., whereby a CAD image P' of the piping member P is generated as shown in FIG. 1a. Using a CAD system and its program, connecting part images 1, such as eyejoint images and clamp images, are generated and distributed along the center line of the piping member image P' as shown in FIG. 1b.

Figure 1E:
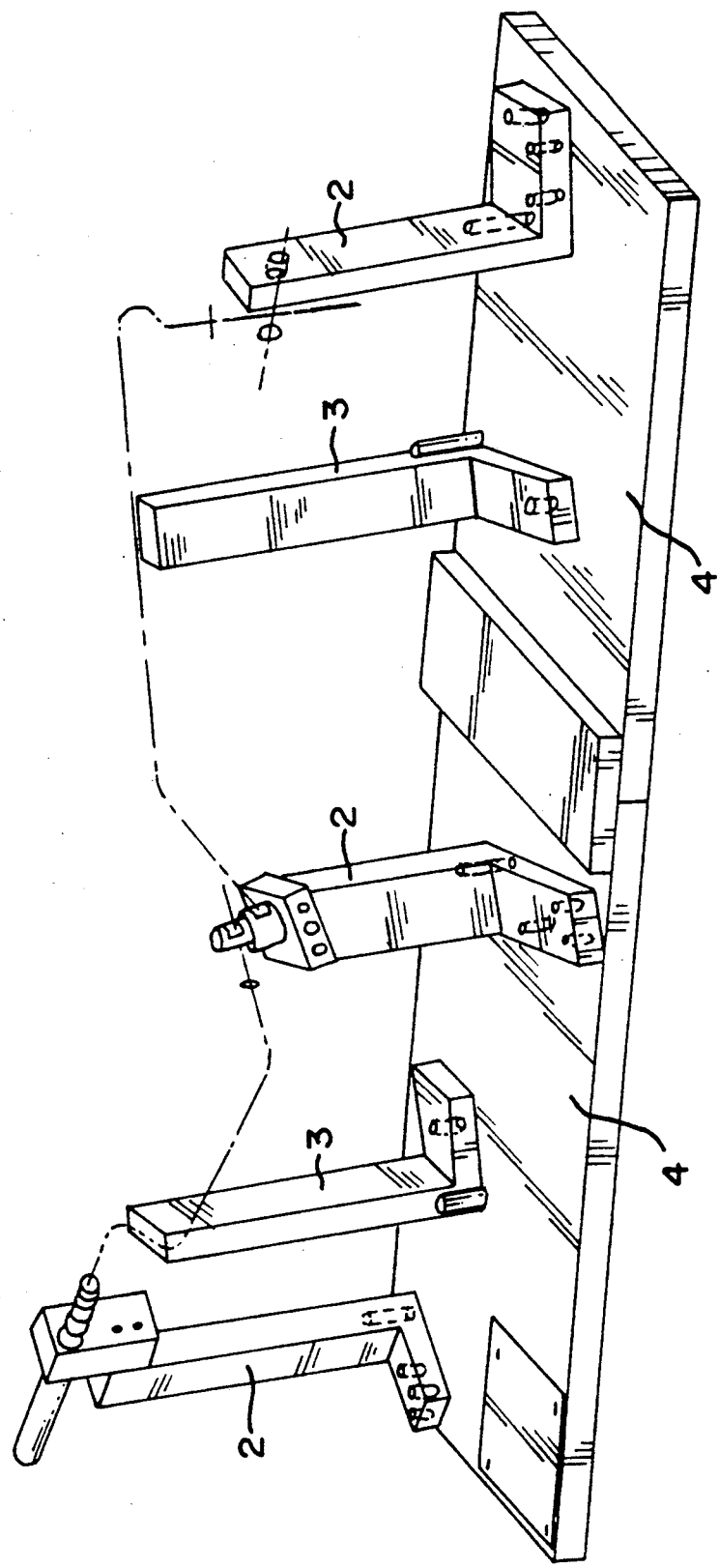

To facilitate the manufacture of the guide jig, the piping member image P' is rotated to determine the reference plane of the guide jig (see FIGS. 1c₁ and 1c₂). The images of intermediate equerres 3 and receiving equerres 2 (for supporting eyejoints, clamps, pins, etc.) are distributed at the ends and intermediate important points of the piping member image P' as shown in FIG. 1d, and a base plate image 4 is arranged in relation to these equerre images 2 and 3 as shown in FIG. 1e. In case the guide jig is large in size, the base plate image may be divided into several. After the CAD image of the guide jig is generated as described above, NC data used in machining actual equerres 2 and 3 and actual base plate 4 using a machining center is generated and stored in a floppy disk, magnetic tape, etc.

Then, the NC data stored in the floppy disk or the like is read into the machining center through its diskette unit; the actual equerres 2 and 3, actual base plate 4, etc. are machined using the machining center; standard parts 5, such as eyejoint receivers and pin receivers, are attached to the equerres 2 and 3 as shown in FIG. 1f; and the equerres 2 and 3, preferably after being positioned using knock pins, are bolted and secured to the base plate 4 as shown in FIG. 1g.

Similarly, each receiving element for the piping member P is secured to each of selected equerres with a desired orientation.

As described above, according to the present invention, the base plate and equerres are machined on the basis of the NC data previously obtained from the design drawing of the piping member using the CAD system, the equerres are accurately positioned by driving the knock pins and secured to the base plate by tightening bolts, and the standard parts are attached to the equerres using the knock pins, bolts, etc. Therefore, there is no need to draw the marking-off lines on the base plate and equerres and attach the parts to them by welding or the like in accord with the marking-off lines, in contrast to the prior art. Accordingly, the manufacturing time and steps can be remarkably reduced, the manufacturing cost can be decreased, and the guide jig for the piping member bent two- or three-dimensionally can be manufactured very accurately and reliably.

What is claimed is:

1. A method of manufacturing a guide jig for positioning connecting parts with respect to a piping member bent at least two-dimensionally, said method using a computer, a CAD system and an NC machining center, comprising the steps of generating piping member shape data by entering into the computer X-, Y- and Z-coordinates of selected points, bend radiuses, and end shapes of the piping member on the basis of a design drawing thereof, generating an image of the piping member by applying the member shape data to the CAD system, selecting a reference plane of the guide jig by rotating the image of the piping member and the connecting parts, using the CAD system for generating images of a plurality of equerres for the guide jig of the piping member and the connecting parts in the selected reference plane, using the CAD system for generating images of at least one base plate for supporting the equerres of the guide jig, generating NC data for machining the equerres and the base plate on the basis of the CAD layout of the guide jig with equerres and the base plate arranged therein, machining the base plate and the equerres by applying the NC data to the machining center, including machining means for attaching standard parts to the equerres, and machining means for at least temporarily securing the equerres to the base plate, and attaching the machined equerres to the machined base plate using the means for at least temporarily securing the equerres to the base plate.

2. A manufacturing method of a guide jig according to claim 1, wherein the connecting parts are eyejoints and/or clamps.

3. A manufacturing method of a guide jig according to claim 1, wherein the NC data is stored in a floppy disk or magnetic tape.

4. A manufacturing method of a guide jig according to claim 1, wherein the standard parts are eyejoint receivers and/or pin receivers.

5. A manufacturing method of a guide jig according to claim 1, wherein the equerres having the standard parts attached thereto, are temporarily positioned on the base plate using knock pins, and then are further secured to the base plate using bolts.

* * * * *